United States Patent
Lin et al.

(10) Patent No.: US 9,201,661 B2
(45) Date of Patent: Dec. 1, 2015

(54) BOOTING METHOD AND ELECTRONIC DEVICE

(71) Applicant: Wistron Corporation, New Taipei (TW)

(72) Inventors: Margaret Peyi Lin, New Taipei (TW); Cho-Pin Su, New Taipei (TW); Yu-Ping Chen, New Taipei (TW); Ming-Hung Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 212 days.

(21) Appl. No.: 14/029,800

(22) Filed: Sep. 18, 2013

(65) Prior Publication Data
US 2014/0223159 A1 Aug. 7, 2014

(30) Foreign Application Priority Data
Feb. 4, 2013 (TW) .............................. 102104242 A

(51) Int. Cl.
*G06F 9/44* (2006.01)
(52) U.S. Cl.
CPC .................................. *G06F 9/4401* (2013.01)
(58) Field of Classification Search
None
See application file for complete search history.

(56) References Cited

U.S. PATENT DOCUMENTS 6,356,965 B1 * 3/2002 Broyles et al. ................ 710/104
2012/0239918 A1 * 9/2012 Huang .............................. 713/2

FOREIGN PATENT DOCUMENTS

TW 200619965 6/2006

OTHER PUBLICATIONS

"Office Action of Taiwan Counterpart Application", issued on Sep. 19, 2014, p. 1-p. 9, with English translation thereof.

* cited by examiner

*Primary Examiner* — Paul Yanchus, III
(74) *Attorney, Agent, or Firm* — Jianq Chyun IP Office

(57) ABSTRACT

A booting method is provided. In the booting method, a basic input/output system (BIOS) is activated to check a first set value. When the first set value corresponds to a fast boot mode, the BIOS performs a fast boot process, in which the fast boot process is interrupted when the BIOS receives a system control interrupt. The BIOS changes a second set value and the first set value according to the system control interrupt, so that the first set value corresponds to a normal boot process. Next, the BIOS is reactivated. Further, the BIOS performs a normal boot process when the first set value corresponds to the normal boot mode, in which the BIOS checks the second set value, so as to execute an operating process corresponding to the second set value and recover the second set value and the first set value.

16 Claims, 2 Drawing Sheets

BOOTING METHOD AND ELECTRONIC DEVICE

CROSS-REFERENCE TO RELATED APPLICATION

This application claims the priority benefit of Taiwan application serial no. 102104242, filed on Feb. 4, 2013. The entirety of the above-mentioned patent application is hereby incorporated by reference herein and made a part of this specification.

BACKGROUND OF THE INVENTION

1. Field of the Invention

The present invention relates to an operating method for an electronic device and more particularly to a booting method and an electronic device using the same.

2. Description of Related Art

A computer system is generally composed by devices such as a main board, a central processing unit (CPU) and a storage device. When the computer system is powered on, the CPU inside of the computer system automatically executes a series of commands, said commands may be divided into three categories based on its functionality, including a system configuration analysis, a power on self test and an operation system loading. During a booting process, information including a model number of the CPU, a size of a memory and a model number of the storage device is first being analyzed as a reference indicator for other operations. Later, the CPU obtains a program code of a basic input/output system (BIOS) from a BIOS chip of the main board as to perform the power on self test, so that an initialization for various hardware may be performed to ensure the computer system to operate normally. Lastly, the booting process is completed after loading the operating system and handing over control of the computer system to the operating system.

However, the initialization for the hardware during the booting process usually consumes a long period of time, thus a user may have to wait for a while before a screen showing the operating system. Therefore, a method of achieving a fast booting operation becomes one of important topics in the current technology.

SUMMARY OF THE INVENTION

The invention is directed to a booting method and an electronic device using the same. In the method, a fast boot process as well a normal boot process may both be executed, so as to meet the production-line requirements for executing various operating processes after the normal boot process is performed.

The invention provides a booting method for an electronic device having an embedded controller. The method includes: activating a basic input/output system (BIOS), checking a first set value by the BIOS, performing a fast boot process by the BIOS when the first set value corresponds to a fast boot mode, in which the fast boot process is interrupted when the BIOS receives a system control interrupt from the embedded controller and before the fast boot process is performed, the BIOS changes a second set value and the first set value according to the system control interrupt, so that the first set value corresponds to a normal boot mode, and the BIOS is reactivated. Further, the method comprises performing a normal boot process by the BIOS when the first set value corresponds to the normal boot mode, in which the BIOS checks the second set value, an operating process corresponding to the second set value is executed and the BIOS recovers a second set value to an initial value while changing the first set value, so that the first set value corresponds to the fast boot mode.

According to one embodiment of the present invention, the operating process includes entering a BIOS setup, performing a recovery, performing a multi-boost process, performing the normal boot process to enter an operating system, performing the normal boot process under no boot loader found, or performing a crisis boot process.

According to one embodiment of the present invention, the electronic device includes a storage device for storing a set value mapping table, and the BIOS changes the second set value according to the system control interrupt further includes determining the second set value corresponding to the system control interrupt according to the set value mapping table.

According to one embodiment of the present invention, the embedded controller includes a keyboard controller.

According to one embodiment of the present invention, the electronic device further includes a display, and the BIOS fixes a resolution of the display to a standard video electronics standards associated (VESA) resolution during the fast boot process.

According to one embodiment of the present invention, after the fast boot process, the booting method further includes entering an operating system, wherein a hardware initialization process is performed in the operating system.

In the fast boot process of the invention, it is predetermined to omit the step of performing the initialization for hardware and driver not requiring the initialization during the boot process, and the initialization for the hardware and the driver is performed only after the booting process is proceeded to enter the operating system, so as to achieve the fast booting operation. In addition, the system control interrupt may be generated by specific key(s) pressed by the user, so as to interrupt the fast boot process and reactivate the electronic device to perform a normal boot process. In other words, based on different keys pressed by the user, the BIOS is changed to have different sett values, so that the booting process may be reactivated to perform the normal boot process and execute the different operating process. As a result, besides performing the fast boot process, the electronic device may also meet the requirements of various operating processes which need to be executed under the circumstance that the electronic device is boot in the normal boot mode during the production line. Therefore, the production process of the electronic device is more smoothly.

To make the above features and advantages of the invention more comprehensible, several embodiments accompanied with drawings are described in detail as follows.

DESCRIPTION OF THE EMBODIMENTS

Figure 1:
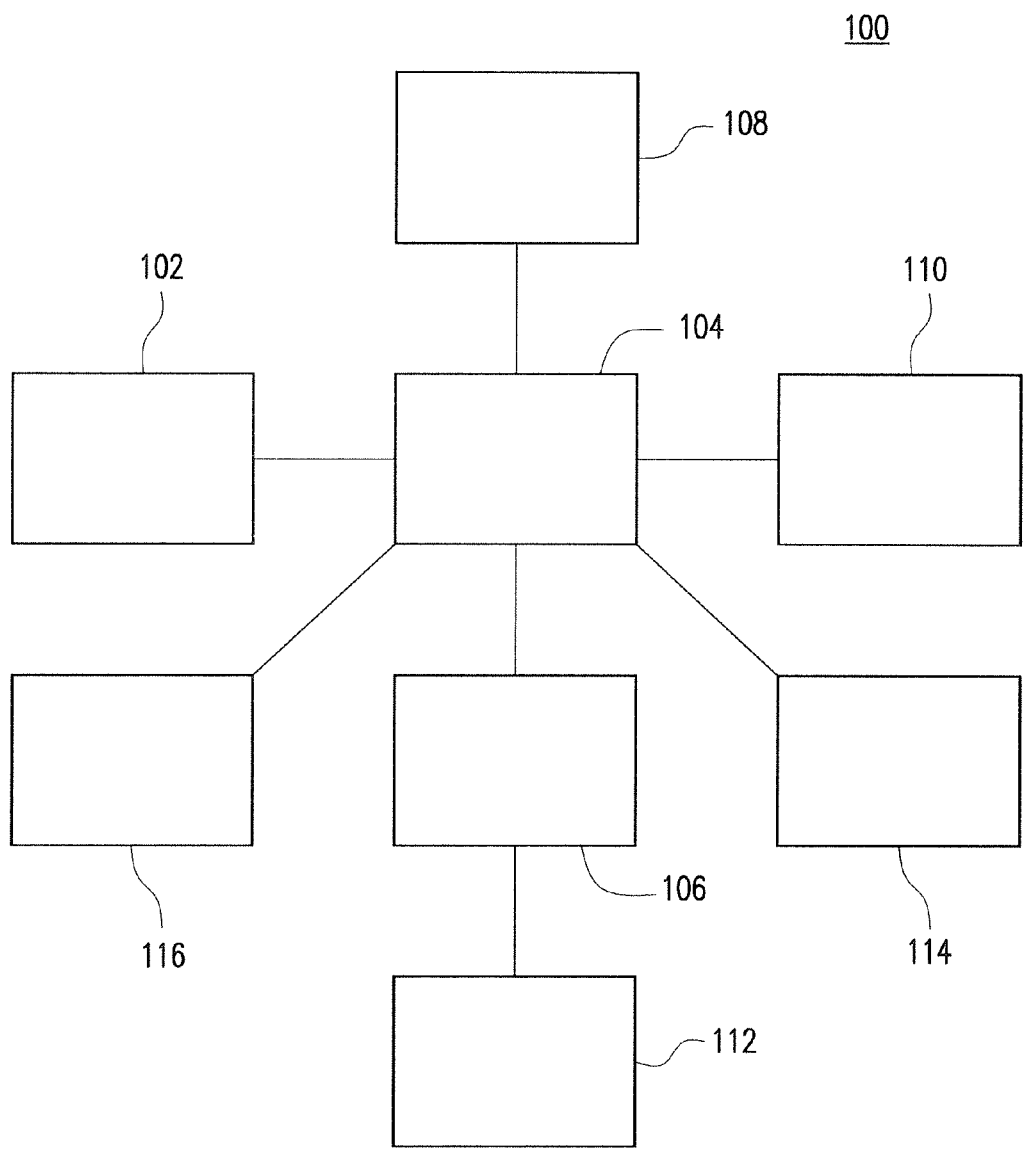
FIG. 1 is schematic view of illustrating an electronic device according to an embodiment of the invention.

FIG. 1 is schematic view of illustrating an electronic device according to an embodiment of the invention. In the present embodiment, an electronic device 100 may be, for example, a personal computer, a server or a tablet personal computer. Referring to FIG. 1, the electronic device 100 includes a basic input/output system (BIOS) chip 102, a system controller 104, an embedded controller (EC) 106, a processor 108, a memory unit 110 ad a keyboard 112. Therein, the processor 108 is coupled to each of components via the system controller 104, and the system controller 104 is coupled to each of peripheral devices such as the memory unit 110, the BIOS chip 102 and the keyboard 112. In other words, the processor 108 is respectively coupled to the BIOS chip 102, the embedded controller 106 and the memory unit 102 via the system controller 104, whereas the embedded controller 106 is coupled to the keyboard 112.

The memory unit 110 may be, for example, a random access memory (RAM). Herein, drivers for all of the components in the electronic device 100 and the operating system are first loaded into the memory unit 110 for the processor 108 to read. For instance, the processor 108 loads the BIOS in the BIOS chip 102 into the memory unit 110 via a shadow RAM according to a boot signal, so as for the processor 108 to read and activate the BIOS.

The processor 108 may be, for example, a central processing unit (CPU) for executing data in hardware, firmware and software in the electronic device 100. The system controller 104 is a bridge for the processor 108 to exchange information to the outside. In the present embodiment, the system controller 104 includes a north bridge chip and a south bridge chip. In other embodiments, the system controller 104 may also be the south bridge chip while the north bridge chip is integrated into the processor 108. However, the invention is not limited thereto. Moreover, the embedded controller 106 includes a keyboard controller (KBC).

The BIOS chip 102 is a chip storing a system firmware such as the basic input/output system (BIOS). For instance, a booting process may be divided into a boot block stage and a power on self test (POST) stage, which are merely examples used in the present embodiment, the invention is not limited thereto. During the boot block stage, the memory unit 110 is in a disabled status since it is not initialized. When a boot signal or a reset signal is received, the processor 108 may execute a boot block in the BIOS chip 102, so as to perform an initialization for the memory unit 110 and the system controller 104. After the initialization for the memory unit 110 is completed, the BIOS in the BIOS chip 102 is then loaded into the memory unit 110 for executing subsequent steps in the booting process. Furthermore, set values of the BIOS are stored in a complementary metal-oxide semiconductor random access memory (CMOS RAM).

Moreover, the electronic device 100 of the present embodiment further includes a display 114 and a storage device 116. The processor 108 is respectively coupled to the display 114 and the storage device 116 via the system controller 104.

Figure 2:
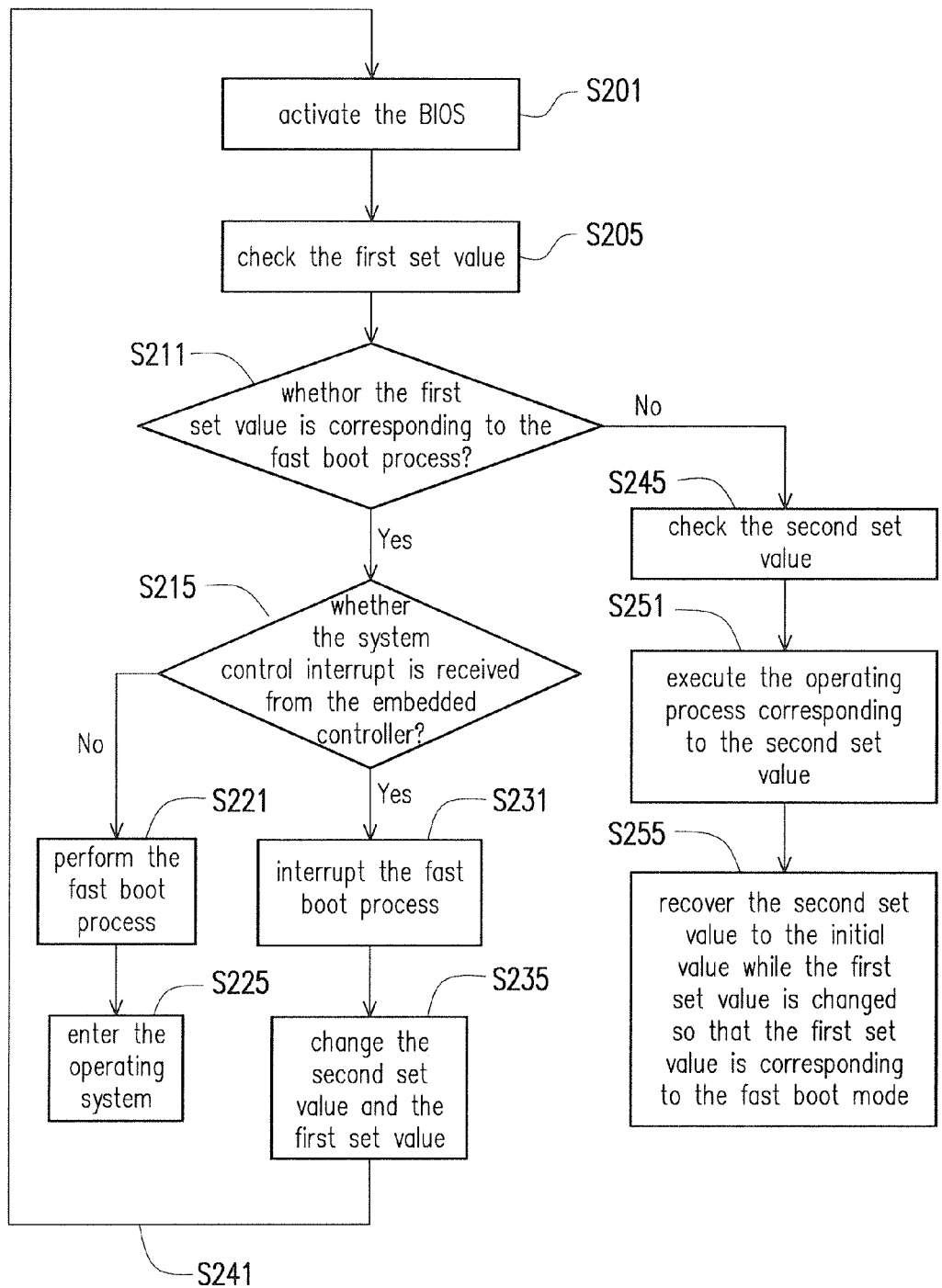
FIG. 2 is a process flowchart illustrating a booting method according to an embodiment of the invention.

FIG. 2 is a process flowchart illustrating a booting method according to an embodiment of the invention. Referring to FIG. 1 and FIG. 2, in step S201, the BIOS is activated. In other words, the processor 108 loads the BIOS in the BIOS chip 102 into the memory unit 110, so as to activate the BIOS. Next in step S205, a first set value stored in the CMOS RAM is checked as to determine whether the first set value corresponds to a fast boot process or a normal boot process. For instance, when the first set value stored in an address 0x55 of the CMOS RAM is 0, the first set value corresponds to the fast boot process (step S211). On the other hand, when the first set value is 1, the first set value corresponds to the normal boot process.

In steps S215 and S221, the BIOS performs the fast boot process when the first set value corresponds to a fast boot mode while a system control interrupt (SCI) is not received from the embedded controller. The operating system is then entered (step S225). In other words, during the fast boot process, in case when the system control interrupt is not activated by a user via the keyboard, the BIOS is predetermined to perform the fast boot process and enter the operating system after the fast boot process. The so-called fast boot process is referred to changing of program code of the BIOS, so that the BIOS during the POST stage of the booting process may omit or simplify the initialization of the hardware and the driver (e.g., an industry standard architecture (ISA) array device, a universal serial bus (USB) device, an optical disk driver (ODD), a USB port, a local area network (LAN), a high-definition multimedia interface (HDMI), a serial advanced technology attachment (SATA) or a display port) which may not need to be initialized or pre-initialized in the booting process, so as to reduce time consumed for booting. When the electronic device enters the operating system after the fast boot process (step S225), the initialization for each of the hardware and the driver being omitted or simplified during the POST stage (a hardware initialization process) are performed. In addition, to further reduce the time consumed for booting, the BIOS may further omit the initialization of video graphics array (VGA) driver (e.g., a graphics interchange format decoder (GIF decoder), a JPEG decoder, a Targa graphics adaptor (TGA)), and a resolution of the display 114 may be fixed by the BIOS to a standard video electronics standards association resolution (standard VESA resolution), so as to avoid scanning for an extended display identification data (EDID) of a panel resolution. Therein, the standard VESA resolution may be, for example, 1024×768.

However, the fast boot process is interrupted when the BIOS receives a system control interrupt from the embedded controller and before the fast boot process is performed (i.e., steps S215 and S231). That is, before the fast boot process is performed, the user may press a specific key on the keyboard to activate the system control interrupt, so as to interrupt the current fast boot process and activate an operating process correspondingly. Therein, the aforementioned operating process includes entering a BIOS setup, performing a recovery, performing a multi-boost process, performing the normal boot process to enter an operating system, performing the normal boot process under no boot loader found, or performing a crisis boot process. The multi-boost process may be, for example, a Wake-On-LAN booting, a USB booting or a CD/DVD ROM booting. Next in step S235, the BIOS changes a second set value and the first set value stored in the CMOS RAM according to the system control interrupt. That is, based on different keys pressed by the user for interrupting the fast boot process, the BIOS changes the second set value stored in the CMOS RAM so that the changed second set value corresponds to a different operating process while the first set value is changed to be corresponding to the normal boot mode (e.g., changing the first set value from 0 into 1, so that the first set value corresponds to the normal boot mode).

For instance, when a key F2 on the keyboard 112 is pressed by the user, the second set value stored in an address 0x56 of the CMOS RAM is changed from an initial value of 00 to 01, and the operating process corresponding to the changed second set value is to enter the BIOS setup. When keys Alt and F10 on the keyboard 112 are pressed at the same time by the user, the second set value stored in the address 0x56 of the CMOS RAM is changed from the initial value of 00 into 02, and the operating process corresponding to the changed second set value is to perform the recovery. When a key F12 on the keyboard 112 is pressed by the user, the second set value stored in the address 0x56 of the CMOS RAM is changed from the initial value of 00 into 03, and the operating process corresponding to the changed second set value is to perform the multi-boot process. When a key ESC on the keyboard 112 is pressed by the user, the second set value stored in the address 0x56 of the CMOS RAM is changed from the initial value of 00 into 04, and the operating process corresponding to the changed second set value is to perform the normal boot process to enter the operating system.

In another embodiment, the storage device 116 in the electronic device 100 stores a set value mapping table. Referring to Table 1 as shown below, the set value mapping table stored by the memory unit 166 records the second set value corresponding to each of the different keys of the keyboard which triggers the system control interrupt. Therein, the initial value of the second set value is, for example, 00.

TABLE 1

| The second set value | Keys |
|---|---|
| 01 | F2 |
| 02 | Alt + F10 |
| 03 | F12 |
| 04 | ESC |

The aforementioned step S235 of changing the second set value by the BIOS according to the system control interrupt further includes the BIOS determines the second set value corresponding to the system control interrupt according to the set value mapping table, and changes the second set value accordingly. It should be noted that, with respect to the set value mapping table as described above, the user may add or change a mapping relation between the second set value and the keys on the keyboard 112 by changing the program code of the BIOS based on actual operating stratus. That is, the invention is not limited to the set value mapping table as illustrated in the present embodiment, the set value mapping table may be customized to be expanded freely by the user based on to the actual operations.

After changing the second set value and the first set value in step S235, proceeding to step S241 as to reactivate the BIOS.

Next, the BIOS is activated in step S201. In step S205, the BIOS checks the first set value, and the BIOS performs the normal boot process when the first set value corresponds to the normal boot mode. Next in step S245, the second set value is checked by the BIOS. In step S251, the operating process corresponding to the second set value is executed. For instance, the BIOS setup is entered when the second set value stored in the address 0x56 of the CMOS RAM is 01. The recovery is performed when the second set value stored in the address 0x56 of the CMOS RAM is 02. The multi-boot process is performed when the second set value stored in the address 0x56 of the CMOS RAM is 03. The normal boot process is performed to enter the operating system when the second set value stored in the address 0x56 of the CMOS RAM is 04. The crisis boot process is performed when the second set value stored in the address 0x56 of the CMOS RAM is 05. The normal boot process is performed under no boot loader found when the second set value stored in the address 0x56 of the CMOS RAM is FF.

Next in step S255, the BIOS recovers the second set value to the initial value (e.g., changing the second set value stored in the address 0x56 of the CMOS RAM into 00) while changing the first set value so that the first set value corresponds to the fast boot mode (e.g., changing the first set value stored in the address 0x55 from 1 into 0).

Altogether, the fast boot process of the invention is predetermined to omit the step of performing the initializations of the hardware and the driver which do not need to be initialized or pre-initialized in the booting process, and the initializations of the hardware and the driver are performed only after the booting process is proceeded to enter the operating system, so as to achieve the fast booting operation. As to facilitate in specific conditions, the initialization process for at least one of the hardware and the driver being omitted must be performed in order to execute a specific control or process (e.g., initialization and activation for a LAN network device is required before the wake-on-LAN or connection may be executed to install softwares or programs), the system control interrupt may be generated by specific key(s) pressed by the user in the process of activating the BIOS to interrupt the fast boot process and to reactivate the electronic device to perform a normal boot process. Therefore, the processes that the user intended to control or operate can be executed. In other words, based on different keys pressed by the user, the BIOS changes the set values, so that the booting process may be reactivated to perform the normal boot process and execute the different operating process. As a result, besides performing the fast boot process, the electronic device may also meet the requirements of various operating processes which need to be executed under the circumstance that the electronic device is boot in the normal boot mode during the production line. Therefore, the production process of the electronic device is more smoothly.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A booting method for an electronic device having an embedded controller, the method comprising:
   activating a basic input/output system;
   checking a first set value by the basic input/output system;
   performing a fast boot process by the basic input/output system when the first set value corresponds to a fast boot mode, wherein:
   the fast boot process is interrupted when the basic input/output system receives a system control interrupt from the embedded controller and before the fast boot process is performed;
   the basic input/output system changes a second set value and the first set value according to the system control interrupt, so that the first set value corresponds to a normal boot mode;
   the basic input/output system is reactivated;
   performing a normal boot process by the basic input/output system when the first set value corresponds to the normal boot mode, wherein:
   the basic input/output system checks the second set value;
   an operating process corresponding to the second set value is executed; and
   the basic input/output system recovers the second set value to an initial value while changing the first set value, so that the first set value corresponds to the fast boot mode.

2. The boot method of claim 1, wherein the operating process comprises entering a basic input/output system setup, performing a recovery, performing a multi-boost process, performing the normal boot process to enter an operating system, performing the normal boot process under no boot loader found, or performing a crisis boot process.

3. The boot method of claim 1, wherein the electronic device comprises a storage device for storing a set value mapping table, and the basic input/output system changes the second set value according to the system control interrupt further comprises determining the second set value corresponding to the system control interrupt according to the set value mapping table.

4. The booting method of claim 1, wherein the embedded controller comprises a keyboard controller.

5. The booting method of claim 1, wherein the electronic device further comprises a display, and the basic input/output system fixes a resolution of the display to a standard video electronics standards associated resolution during the fast boot process.

6. The booting method of claim 1, wherein the fast boot process omits or simplifies an initialization process of at least one hardware device during the normal boot process.

7. The booting method of claim 6, after the fast boot process, further comprising entering an operating system, wherein the initialization process of the at least one hardware device omitted or simplified in the fast boot process is performed in the operating system.

8. The booting method of claim 2, wherein the multi-boost process comprises a Wake-On-LAN booting, a USB booting or a CD/DVD ROM booting.

9. An electronic device, comprising:
a basic input/out system chip for storing a basic input/output system;
a memory unit;
an embedded controller;
a processor respectively coupled to the embedded controller, the basic input/output system chip and the memory unit, the processor controls the basic input/output system chip to load the basic input/output system into the memory unit according to a boot signal as to activate the basic input/output system, wherein the basic input/output system:
checks a first set value;
performs a fast boot process when the first set value corresponds to a fast boot mode, wherein:
the fast boot process is interrupted when a system control interrupt is received from the embedded controller and before the fast boot is performed;
a second set value and the first set value are changed according to the system control interrupt, so that the first set value corresponds to a normal boot mode;
the basic input/output system is reactivated;
performs a normal booting process when the first set value corresponds to the normal mode, wherein:
the second set value is checked;
an operating process corresponding to the second set value is executed; and
the second set value is recovered to an initialized value while the first set value is changed, so that the first set value corresponds to the fast boot mode.

10. The electronic device of claim 9, wherein the operating process comprises entering a basic input/output system setup, performing a recovery, performing a multi-boost process, performing the normal boot process to enter an operating system, performing the normal boot process under no boot loader found, or performing a crisis boot process.

11. The electronic device of claim 9, further comprising a storage device for storing a set value mapping table, wherein the basic input/output system changes the second set value according to the system control interrupt further comprises determining the second set value corresponding to the system control interrupt according to the set value mapping table.

12. The electronic device of claim 9, wherein the embedded controller comprises a keyboard controller.

13. The electronic device of claim 9, further comprising a display, wherein the basic input/output system fixes a resolution of the display to a standard video electronic standard associated resolution during the fast boot process.

14. The electronic device of claim 9, wherein the fast boot process omits or simplifies an initialization process of at least one hardware device during the normal boot process.

15. The electronic device of claim 14, after the fast boot process, further comprising the processor performing an operating system, wherein the initialization process of the at least one hardware device omitted or simplified in the fast boot process is performed in the operating system.

16. The electronic device of claim 10, wherein the multi-boost process comprises a Wake-On-LAN booting, a USB booting or a CD/DVD ROM booting.

* * * * *